United States Patent [19]
Shiuh et al.

[11] Patent Number: 4,557,883
[45] Date of Patent: Dec. 10, 1985

[54] PREPARATION AND EXPANSION OF PERLITE ORE FINES

[75] Inventors: Jerome C. Shiuh; Mario P. Tocci, both of Littleton, Colo.

[73] Assignee: Manville Service Corporation, Denver, Colo.

[21] Appl. No.: 345,954

[22] Filed: Feb. 5, 1982

Related U.S. Application Data

[63] Continuation of Ser. No. 170,424, Jul. 21, 1980, abandoned.

[51] Int. Cl.$^4$ .............................................. B29H 7/20
[52] U.S. Cl. ...................................... 264/43; 264/63; 264/117
[58] Field of Search ...................... 264/42, 43, 63, 117

[56] References Cited

U.S. PATENT DOCUMENTS 4,148,941  4/1979  Pope ..................................... 264/117
4,175,158  11/1979  Saunders ............................. 264/117

Primary Examiner—Donald Czaja
Assistant Examiner—V. Fischbach
Attorney, Agent, or Firm—John D. Liter; Cornelius P. Quinn

[57] ABSTRACT

A process is described for the preparation of perlite ore fines for expansion. The ore fines are treated with an agglomerating agent which has a viscous liquid phase at a temperature above ambient temperature but below the critical dehydration temperature of the perlite ore fines. Suitable agglomerating agents mentioned are the boron acids, particularly orthoboric acid and metaboric acid. The perlite ore fines and agglomerating agent are mixed, preferably by dry mixing, and then heated to the temperature of the viscous liquid phase and held at that temperature for a short period while the liquid coats at least a portion of the perlite ore fines and effects agglomeration. Thereafter, the agglomerated perlite ore fines can be expanded in a conventional perlite ore expander. The resulting expanded materials have properties essentially identical to standard expanded perlite ore and are useful for such purposes as insulating fillers and light weight aggregates.

23 Claims, No Drawings

PREPARATION AND EXPANSION OF PERLITE ORE FINES

This is a continuation of application Ser. No. 170,424, filed July 21. 1980, and now abandoned.

TECHNICAL FIELD

The invention here relates to the processing of perlite ore. More particularly, it relates to a method for converting perlite ore fines into expanded perlite.

BACKGROUND OF PRIOR ART

Perlite is a mineral of volcanic origin which generally falls into the rhyolitic class. A unique feature of perlite is that it contains several percent of bound water. If perlite ore is rapidly heated to a temperature on the order of 1600° F. (870° C.), the water is converted to steam and the perlite "pops", i.e., it expands rapidly to a much lower density. The amount of expansion is usually on the order of 4 to 20 times the original volume and the final density of the expanded perlite granules will normally be in the range of about 3.5 to 5 lbs/ft$^3$ (0.06 to 0.08 g/cm$^3$) for use as insulating fillers or about 7 to 15 lbs/ft$^3$ (0.11 to 0.24 g/cm$^3$) for plaster aggregate use. (The exact mechanism of the water-induced expansion is quite complex; see Lehmann et al., "Thermoanalytic Research on Perlite and Perlite-Type Rocks," *Tonind.-Ztg.*, vol. 100, no. 7, pp. 271–274 (1976). For the purposes of the invention herein, however, the above simplified description of the expansion is entirely adequate.)

Perlite ore is normally expanded in large vertical chambers known as "expanders". At the bottom of each expander is a flame generating burner. The perlite ore to be expanded is dropped into the expander at a point above the flame and drops through the hot zone created by the flame. In this hot zone, the perlite particles expand and, because of their expanded volume, are then turned around and carried out of the top of the expansion chamber entrained in the exhaust gas stream. Operation of a typical perlite expander is shown in U.S. Pat. No. 2,572,484 with another variation shown in U.S. Pat. No. 2,639,132.

It has been found over the years that the perlite ore, in order to be expanded satisfactorily, must be in the form of particles or granules having a size of from about +200 mesh (greater than 74 μm) up to approximately 3 to 4 mesh (approximately ¼ inch or 6 mm). Larger particles do not expand well because their weight pulls them through the flame zone too quickly for them to be heated to the expansion temperature and in addition their greater size and stronger structure prevents heat from penetrating to the center of the particle to convert the water to steam and also prevents the steam from fully "popping" the large rigid particle. The presence of these larger particles in the perlite ore prior to expanding causes no significant problems to the perlite ore processor, for such larger materials can be readily screened out of the raw material ore stream from the expanders and recycled to crushing or other size reduction equipment to reduce the large granules to the optimum size for expansion.

At the other end of the size scale, however, the material known as "ore fines" which have particle sizes not greater than 200 mesh (not greater than 74 μm) do pose a significant problem for the ore processor. These materials do not expand well because their light weight and small size causes them to be entrained in the exiting air and gas stream in an expander before they have dropped far enough to encounter the appropriate temperature for expansion. In addition, such fine materials do not move well through the ore handling systems normally in use, which commonly rely in part on gravity feed. Consequently, in the past, ore producers have considered the ore fines to be essentially waste material, although to some extent such unexpanded fine materials may find uses. Generally, however, since the largest market for perlite products is for expanded perlites, the ore processor is desirous of expanding as much of the ore raw material as possible.

It would be possible to handle such fine material if the individual fine particles were agglomerated into larger units which fall in the article size range for conventional perlite expansion. However, heretofore the known processes for agglomerating "perlite fines" have been processes intended to be used with previously expanded material. In the process of expansion, perlite (which is a somewhat brittle material) often shatters upon expansion leaving a substantial amount of fragments of expanded perlite. These fragments are themselves frequently referred to as "fines" but it must be understood that these are "expanded fines" as contrasted to the "ore fines" which are unexpanded and which are the subject of the present invention. U.S. Pat. Nos. 3,235,635 and 4,175,158 both describe processes for agglomerating the expanded perlite fines by addition of water, a fluxing agent or, in the case of U.S. Pat. No. 4,175,158, boric acid. An integral part of both of these described processes, however, is heating and maintaining the expanded perlite fines at temperatures on the order of about 1200° to 1700° F. (650° to 925° C.). At these temperatures, the fluxing materials such as soda ash or $B_2O_3$ (from the boric oxide) act to fuse the expanded perlite fines into larger granules. Such processes are not applicable to ore fines of perlite, however, because exposing the perlite ore to such temperatures will either cause the perlite to pop (if the exposure to the temperature is rapid) or will cause the water of hydration to slowly vaporize and be removed from the ore particle (if the perlite is slowly raised to that temperature) thus leaving no water of hydration to cause the perlite subsequently to pop.

It would therefore be highly desirable to have a process whereby the fine material in perlite ore raw materials can be agglomerated at relatively low temperatures to produce a particle of the appropriate size for conventional expansion.

BRIEF SUMMARY OF THE INVENTION

The invention herein is a process for preparing perlite ore fines for expansion which comprises mixing the perlite ore fines with an agglomerating agent, the agglomerating agent having a viscous liquid phase at a temperature above room temperature but below the critical dehydration temperature of the perlite ore fines with the viscous liquid phase being capable of at least partially coating the perlite ore fines. Thereafter, the perlite ore fines are aggalomerated by heating the mixture of the fines and the agglomerating agent to a temperature at which the agglomerating agent exists in the viscous liquid phase and maintaining the temperature for a period of time sufficient to obtain agglomeration of the fines by the agglomerating agent.

In another aspect, the invention comprises preparing the perlite ore fines for expansion as described above followed by rapid heating of the prepared perlite ore fines to a temperature at which the perlite ore fines expand.

The preferred agglomerating agents are materials of the boron acid system.

DETAILED DESCRIPTION OF THE INVENTION

The present invention involves the treating of perlite ore fines to make them suitable for expansion in a conventional perlite expander. The "fine" portion of the perlite ore, as determined after the ore has been conventionally cleaned, crushed, screened and otherwise made ready for expansion, is normally defined as that portion of the ore which exists as particles having particle sizes of not greater than 200 mesh (i.e., not greater than 74 μm). It will be understood, however, that there is no absolute and distinct dividing line between materials considered "fines" and larger perlite particles considered to be conventional expandible perlite. Thus, while perlite having particle sizes of not greater than 74 μm (−200 mesh) is generally considered to constitute perlite ore fines, in some circumstances particles which are larger than 74 μm can also be considered to be "fine". For instance, in most conventional particle size separator devices, there is not a sharp cut-off of particles at a specified size. Rather there is a distribution of particle sizes with the principal segment being of the designated size but with the entire mass of separated particles also containing some material of larger and/or smaller size. Such is the case with commercial perlite ore separation, wherein the "ore fines" fraction normally contains a portion having particle sizes above 74 μm. Therefore, for the purposes of this invention, the "ore fines" which are beneficially agglomerated by the process of this invention will be defined as a mixture of perlite particles at least 50%, and preferably at least 70%, of which have particle sizes of not greater than 74μm.

After the perlite ore fines (as defined above) have been separated from the remainder of the perlite ore following conventional mining, drying, crushing, sizing and other processes utilized in the perlite ore production industry to prepare raw materials for expansion, the fines are treated in accordance with the present invention. They are first mixed with a suitable agglomerating agent having the properties to be described below. Conveniently such agglomerating agent is a solid material at ambient temperatures and most conveniently, the agglomerating agent has been comminuted into solid particles of approximately the same particle size as the perlite ore fines. The perlite ore fines and agglomerating agent are blended and dry mixed by conventional mixing means such as ribbon blenders to form preferably a dry mixture of fines and agglomerating agent. Where the agglomerating agent is a liquid or has a liquid component at ambient conditions, it is desirable to mix the fines and agglomerating agent and then dry the mixture to facilitate subsequent handling of the mixture.

The agglomerating agent will be a material which is compatible with perlite and which as a viscous liquid phase at a temperature above ambient temperature but below the dehydration temperature of the perlite. The viscous liquid phase must be one that will effect at least partial coating of the perlite ore fines with the liquid. Materials which have such liquid phases at the indicated temperatures but which do not also effect such coating are not suitable for use in the present invention. Examples of such materials which have been tried but found not to work are hydrated sodium silicate and hydrated sodium carbonate ("soda ash"). The preferred materials which do meet the required conditions are materials of the boron acid system, notably orthoboric acid ($H_3BO_3$) and metaboric acid ($HBO_2$). Orthoboric acid is a colorless or white powder at ambient temperatures with a specific gravity of 1.43. At a temperature of approximately 340° F. (170° C.), orthoboric acid is transformed to metaboric acid. Metaboric acid is a white crystalline solid at ambient temperatures with a specific gravity of approximately 2.49. At approximately 460° F. (236° C.), the metaboric acid melts, forming a viscous liquid which may contain some crystals and which recrystallizes upon cooling. The phase change of metaboric acid from solid to liquid at the melting point also results in approximately a 10-fold increase in the surface area. This liquid readily coats onto the perlite ore fine particles.

Descriptions of the boron acid system and the viscous metaboric acid liquid can be found in Kracek et al., "The System, WaterBoron Oxide," *Amer. J. of Sci.*, vol. 35-A, pp. 143–171 (1983); in De Bore (ed.), *Reactivity Of Solids* (1961) in the section by Dollimore et al., "The Kinetics of the Thermal Decomposition of Some Substances Which Decompose to Oxides, and the Production of Active Solids by Such Processes" pp. 627–637; in Kemp, *The Chemistry of Borates: Part I* (1965), pp. 9–21; and in Kirk-Othmer (eds.), *Encyclopdia Of Chemical Technology* (3rd edn., 1978), Vol. 4, pp. 67–77.

The agglomerating agent may be present in any amount from 0.1% to about 10% by weight based on the weight of the perlite ore fines, with the agent preferably being present as from 0.5 to 3 weight percent.

Following mixing of the perlite ore fines and the agglomerating agent, the blended materials are subjected to heating to a temperature at which the agglomerating agent is converted to the viscous liquid phase, but which temperature does not exceed the "critical dehydration temperature" of the perlite. For the purposes of this invention, the term "critical dehydration temperature" in fact represents time-temperature combinations. It is known that the ability of perlite to expand is based generally on essentially all of the bound water being simmultaneously converted to stream, so that the expansion of the water on vaporization causes the perlite to expand as it seeks to escape from the article. If, however, the bound water is vaporized slowly, each increment of vaporized water will have time to diffuse or migrate slowly out of the unexpanded particle, ultimately leaving the perlite particle so depleted of water that rapid heating of the particle under normal expansion conditions will not result in expansion. This slow "dehydration" of the particle (which is "slow" in comparison to the rate of the normal expansion-causing vaporization) occurs at varying rates which are dependent on both the temperature to which the perlite is exposed and also to the length of time of that exposure. As the temperature rises, the period of exposure time necessary to effect sufficient dehydration to prevent expansion is decreased. (At a sufficiently high temperature, of course, vaporization occurs so rapidly and so uniformly across the particle that expansion is induced, since there is not sufficient time available to let the vaporized water escape from the particle by migration and/or diffusion.) In general, at temperatures below about 1000° F. (540° F.), and especially below about 700° F. (370° C.), significant dehydration does not occur in the time periods required for the liquification and application of the agglomerating agent. Therefore the effect of time can be simplified by merely requiring that the liquification and application of the agglomerating agent be conducted at a temperature below the "critical dehydration temperature," i.e., that temperature at which the time period of the liquification and application would be the minimum time in which significant dehydration could occur.

Normally the dry mixing and heating are done in separate but closely sequential steps. They could, however, be performed simultaneously by using a heated mixer. Alternatively, if the agglomerating agent is a stable material, mixing could take place long before heating with the mixing material simply being stored until time to be heated. This would also permit the mixing and heating to be conducted at separate locations which are perhaps even quite remote from each other.

The time of maintenance at temperature is dependent upon the particular agglomerating agent being used. For the boron acids, it has been found that a time of 4 minutes at 600° F. (315° F.) provides quite satisfactory agglomeration of perlite fines. The heating time should be kept as short as possible commensurate with good agglomeration because of the tendency of the perlite to dehydrate over prolonged heating periods, even at relatively low temperatures. Heating times on the order of 1 to 20 minutes, preferably 3 to 10 minutes, are considered to be quite adequate.

In one aspect of the invention, the perlite ore fines which have completed their heating with the agglomerating agent are passed directly to a perlite expander where they are expanded. This is quite feasible when the expander has associated therewith a pre-heat chamber into which the mixed perlite and agglomerating agent can be placed for heating. The pre-heat chamber discharges into the expander feed system so that the agglomerated perlite ore fines can be fed directly to the expander for expansion. Alternatively, however, the agglomerating agent will be one which can be cooled and then rapidly re-melted during expansion. This would permit the perlite ore processor to agglomerate the ore fines with the agglomerating agent at the mine, or other ore producing or preparation site, then store or ship the agglomerated perlite ore fines to a remote location for expansion with the agglomerated fines being put directly into the expander feed system without any further heating. This is the preferred manner of handling the heat treating and expansion. This is due to several factors: (1) Many perlite expanders are of rather small capacity and do not have heating equipment available in conjunction with the expander. Consequently the processor wishing to use this process in conjunction with perlite expansion would frequently be forced to add a heating unit at considerable cost to his perlite expansion equipment. (2) Once the boric acid is coated on the perlite particles, the two components will not segragate as they would if they were merely blended into a simple dry mixture. (3) A more uniform agglomerated fines product can be obtained, since the ore producer treats the perlite ore fines and thus can run a single consistent operation, rather than having a number of different end users treating perlite or fines in a variety of different types of mixers, heaters and under perhaps significantly different conditions. Such cooling, re-heating and remelting are quite feasible when orthoboric acid is used as the agglomerating agent.

Once the perlite ore fines have been agglomerated with the agglomerating agent and heated for the appropriate time, they are then ready to be expanded in a conventional perlite expander. As noted above, the expansion can come immediately after the heat treating or it can be delayed for any desired length of time. Expansion of the treated perlite ore fines is in the same manner as conventional perlite expansion of the larger normal perlite particles. The perlite ore fines can be expanded by themselves or can be mixed into a common feed with the original standard size perlite feed particles.

The examples below will illustrate the process of this invention. In these experiments, both the standard perlite ore materials and the perlite ore fines were from a commercial New Mexico perlite mining operation. Conventional mining, cleaning, crushing, sizing and other ore processing techniques were used. Agglomeration was with orthoboric acid in amounts of 1 or 2 percent by weight of the perlite ore fines, as noted. The fines portion of the ore was defined to be that portion in which 70% of the particles were of 74 $\mu$m particle size or smaller. Heating of the ore fines/agglomerating agent mixture was for 4 minutes at 600° F. (315° C.). The "Series A" runs illustrate the expansion of the perlite to the lowest achievable loose weight "Series B" are experiments in which the perlite was expanded to a loose weight in the range of 3 to 4 lb/ft$^3$ (0.048 to 0.064 g/cm$^3$), which is the conventional density for perlite use as an insulating filler. The processing conditions were otherwise the same as in "Series A". "Loose weight" is often referred to as "bulk density" or "apparent density" and refers to the nominal density of a loosely packed powder.

Table 1 below shows the particle size distributions of the perlite ore fines and the standard ore as well as various expanded materials.

TABLE 1

| | | | SERIES A | | | |
|---|---|---|---|---|---|---|
| | | | Percent of Material Larger Than Indicated Particle Size | | | |
| | | | After Expansion | | | |
| Particle Size, $\mu$m | Ore Fines, as received[a] | Standard Ore, as received[a] | Ore Fines, without agglomeration | Agglomerated Fines (1% boric acid) | Agglomerated Fines (2% boric acid) | Standard Ore |
| 30 | 82 | 100 | 100 | 100 | 100 | 100 |
| 50 | 51 | 100 | 97 | 100 | 100 | 100 |
| 74 | 30 | 100 | 86 | 100 | 100 | 100 |
| 100 | 18 | 100 | 75 | 98 | 98 | 98 |
| 150 | 5 | 95 | 57 | 92 | 92 | 92 |
| 200 | 3 | 15 | 42 | 85 | 85 | 85 |
| 300 | 1 | 5 | 22 | 70 | 70 | 70 |
| 400 | — | 1 | 12 | 56 | 56 | 56 |
| 600 | — | — | 3 | 30 | 30 | 30 |
| 750 | — | — | 1 | 13 | 13 | 13 |

TABLE 1-continued

SERIES A
Percent of Material Larger Than Indicated Particle Size

| Particle Size, μm | Ore Fines, as received[a] | Standard Ore, as received[a] | After Expansion | | | |
|---|---|---|---|---|---|---|
| | | | Ore Fines, without agglomeration | Agglomerated Fines (1% boric acid) | Agglomerated Fines (2% boric acid) | Standard Ore |
| 900 | — | — | — | 1 | 1 | 1 |
| Median Particle Size, μm | 41 | 165 | 172 | 440 | 440 | 440 |

Note:
[a]"As received" means prior art ore or ore fines fully prepared as as expander feed but not yet expanded Table 2 below illustrates typical properties of the expanded materials. The "energy consumption" is the amount of energy required to expand the indicated material.

TABLE 2

SERIES A

| | Loose Weight | | Recovery, % | Energy Consumption[a] | |
|---|---|---|---|---|---|
| | lb/ft³ | g/cm³ | | BTU/lb | Cal/g |
| Non-agglomerated Ore Fines | 2.1 | 0.034 | 83.3 | 23000 | 12800 |
| Agglomerated Fines (1% boric acid) | 1.8 | 0.029 | 90.0 | 9940 | 5520 |
| Agglomerated Fines (2% boric acid) | 1.67 | 0.027 | 94.5 | 13600 | 7560 |
| Standard Ore | 1.62 | 0.026 | 92.9 | 18300 | 10200 |

Note:
[a]The data here are for a small (laboratory scale) expander. The relative energy consumption per unit of perlite weight would be expected to be 8-10 times less for a commercial scale expander.

It will be evident from these experimental data that the agglomerated perlite or fines expand to a size and loose weight essentially equivalent to that of standard perlite ore.

Similar data are presented in Tables 3 and 4 below for the "Series B" materials.

TABLE 4

SERIES B

| | Loose Weight | | Recovery, % | Energy Consumption[a] | |
|---|---|---|---|---|---|
| | lb/ft³ | g/cm³ | | BTU/lb | Cal/g |
| Non-agglomerated Ore Fines | 3.5 | 0.056 | 89.1 | 15800 | 8740 |
| Agglomerated Fines (1% boric acid) | 3.0 | 0.048 | 92.4 | 9080 | 5040 |
| Agglomerated Fines (2% boric acid) | 3.5 | 0.056 | 94.4 | 7670 | 4260 |
| Standard Ore | 3.72 | 0.059 | 93.6 | 16200 | 9000 |

Note:
[a]The data here are for a small (laboratory scale) expander. The relative energy consumption per unit of perlite weight would be expected to be 8-10 times less for a commercial scale expander.

It will be evident from these data that the agglomerated fines of the process of this invention following expansion are equivalent to standard expanded perlite ore used for insulating fillers. In addition, the data from both Series A and Series B indicate that the energy input required to expand the agglomerated fines is significantly less than that required to expand standard perlite ore. In addition, both the Series A and Series B experiments clearly indicate that the agglomerated perlite fines yield significantly greater recovery and significantly higher median particle sizes than the expanded perlite ore fines without any agglomeration. The latter property is particularly significant since the value of an

TABLE 3

SERIES B
Percent of Material Larger Than Indicated Particle Size

| Particle Size, μm | Ore Fines, as received[a] | Standard Ore, as received[a] | After Expansion | | | |
|---|---|---|---|---|---|---|
| | | | Ore Fines, without agglomeration | Agglomerated Fines (1% boric acid) | Agglomerated Fines (2% boric acid) | Standard Ore |
| 30 | 82 | 100 | 100 | 100 | 100 | 100 |
| 50 | 51 | 100 | 95 | 98 | 98 | 100 |
| 74 | 30 | 100 | 79 | 94 | 94 | 100 |
| 100 | 18 | 100 | 67 | 90 | 86 | 100 |
| 150 | 5 | 95 | 50 | 83 | 73 | 96 |
| 200 | 3 | 15 | 37 | 76 | 62 | 89 |
| 300 | 1 | 5 | 19 | 62 | 45 | 70 |
| 400 | — | — | 9 | 36 | 24 | 44 |
| 600 | — | — | 4 | 9 | 6 | 17 |
| 750 | — | — | 1 | 2 | 2 | 6 |
| 900 | — | — | — | 1 | 1 | 1 |
| Median Particle Size, μm | 41 | 165 | 150 | 340 | 260 | 375 |

Note:
[a]"As received" means prior art ore or ore fines fully prepared as expander feed but not yet expanded expanded perlite as an insulating or cement filler is directly proportional to the particle size of the perlite.

STATEMENT OF INDUSTRIAL APPLICATION

The invention herein relates to the perlite expansion industry. It is particularly useful in the expansion of the fine portion of perlite ore. Expanded perlite ores find utility as thermal insulations in such materials as structural roofing boards and insulating wall boards for residential, commercial and industrial buildings. Expanded perlite also finds considerable use as a light weight aggregate for construction materials such as plaster, gypsum and concrete. Construction panels made of the materials containing light weight aggregates are used where strength is not a prime requirement but where fire resistance, insulation and light weight are major considerations. Typical applications include installation in tall buildings and long span bridges.

We claim:

1. A process for preparing and expanding perlite ore fines which comprises mixing said perlite ore fines with an agglomerating agent which has a viscous liquid phase at a temperature above ambient temperature but below the critical dehydration temperature of said perlite ore fines, said viscous liquid phase being capable of at least partially coating said perlite ore fines, and agglomerating said ore fines by heating the mixture of said perlite ore fines and agglomerating agent to a temperature at which said agglomerating agent exists as said viscous liquid phase, and maintaining said temperature for a period of time sufficient to obtain a viscous agglomeration of said perlite ore fines and said agglomerating agent and feeding said viscous agglomeration into a perlite expander to form said perlite ore fines into expanded perlite of conventional size and density.

2. A process as in claim 1 wherein said perlite ore fines comprise a mixture of perlite ore particles at least 50% of which have particle sizes of not greater than 74 μm.

3. A process as in claim 2 wherein said perlite ore fines comprises a mixture of perlite ore particles at least 70% of which have particle sizes of not greater than 74 μm.

4. A process as in claims 1, 2 or 3 wherein said agglomerating agent is a boron acid.

5. A process as in claim 4 wherein said boron acid is orthoboric acid, said orthoboric acid having a transition to metaboric acid at a temperature below the formation of said viscous liquid phase.

6. A process as in claim 4 wherein said boron acid is metaboric acid.

7. A process as in claim 1, 2 or 3 wherein said mixing is dry mixing and both the perlite ore fines and agglomerating agent are in the form of granular powders.

8. A process as in claim 7 wherein said agglomerating agent is a boron acid.

9. A process as in claim 8 wherein said boron acid is orthoboric acid, said orthoboric acid having a transition to metaboric acid at a temperature below the formation of said viscous liquid phase.

10. A process as in claim 9 wherein said boron acid is metaboric acid.

11. A process as in claims 1, 2, 3 or 4 wherein said temperature at which said agglomerating agent exists as a viscous liquid phase is not greater than 1000° F.

12. A process as in claim 11 wherein said temperature is not greater than 700° F.

13. A process for preparing and expanding perlite ore fines which comprises mixing said perlite ore fines with an agglomerating agent which has a viscous liquid phase at a temperature above ambient temperature but below the critical dehydration temperature of said perlite ore fines, heating the mixture of said ore fines and agglomerating agent to a temperature at which said agglomerating agent exists as said viscous liquid phase and below the critical dehydration temperature of the perlite ore fines, maintaining said temperature for a period of time sufficient to obtain a viscous agglomeration of said perlite ore fines and said agglomerating agent, cooling said viscous agglomeration so that said perlite ore fines have at least a partial coating of said agglomerating agent thereon; heating said coated perlite ore fines to a temperature at which said agglomerating agent exists as said viscous liquid phase and then applying more heat to expand said perlite ore fines into expanded perlite of conventional size and density.

14. A process as in claim 13 wherein said agglomerating agent is a member of the boron acid system.

15. A process as in claim 14 wherein the member of the boron acid system is a boric acid selected from the group consisting of orthoboric acid and metaboric acid.

16. A process as in claim 15 wherein the mixture of the agglomerating agent and the perlite ore fines is heated to a temperature which is above the melting point of the agglomerating agent and is less than about 1000° F. for a period of time from about 1 to about 20 minutes.

17. A process as in claim 15 wherein the boric acid is utilized in an amount of from about 0.1 to about 10 percent by weight based on the weight of the perlite ore fines.

18. A process as in claim 17 wherein the mixture of the boric acid and perlite ore fines is heated to a temperature above the melting point of the boric acid and less than about 700° F. for a time period of from about 3 to about 10 minutes.

19. A process as in claim 18 wherein the boric acid is orthoboric acid.

20. A process as in claim 19 wherein the boric acid is transformed to metaboric acid durning the process.

21. A process as in claim 18 wherein the boric acid is metaboric acid.

22. A process as in claim 18 wherein said perlite ore fines comprise a mixture of perlite ore particles at least 50% of which have particle sizes of not greater than 74 μm.

23. A process as in claim 18 wherein said perlite ore fines comprise a mixture of perlite ore particles at least 70% of which have particle sizes of not greater than 74 μm.

* * * * *